United States Patent [19]

Reffelmann

[11] 4,271,108

[45] Jun. 2, 1981

[54] METHOD AND APPARATUS FOR THE DISCONTINUOUS PRODUCTION OF A FOAMED BLOCK

[75] Inventor: Gerd Reffelmann, Overath, Fed. Rep. of Germany

[73] Assignee: Bayer Aktiengesellschaft, Bayerwerk, Fed. Rep. of Germany

[21] Appl. No.: 108,992

[22] Filed: Jan. 2, 1980

[30] Foreign Application Priority Data

Jan. 13, 1979 [DE] Fed. Rep. of Germany ....... 2901177

[51] Int. Cl.³ .............................................. B29D 27/04
[52] U.S. Cl. ..................................... 264/51; 264/338; 425/89; 425/200; 425/817 R; 521/917
[58] Field of Search ................... 264/54, 51, 331, 338; 425/817 R, 200, 89; 521/917

[56] References Cited

U.S. PATENT DOCUMENTS 2,649,620 8/1953 Miller ............................... 425/200 X
3,771,770 11/1973 Lehmann .

FOREIGN PATENT DOCUMENTS 224263 11/1958 Australia .................................. 521/917

*Primary Examiner*—Philip Anderson
*Attorney, Agent, or Firm*—Gene Harsh; Joseph C. Gil; R. Brent Olson

[57] ABSTRACT

The invention is directed to a method and device for the discontinuous production of block foam. The device has a mixing unit provided with component feed lines and a stirrer. The device is vertically movable on a bridgelike framework. The mixing unit has a bottomless cylindrical shell which serves as a mixing container. The bottomless cylindrical shell can be arranged on a head plate and can be placed on the bottom of a mold placed beneath it. On the bottom of the mold is a flexible elastic layer on top of which is arranged a plastic film.

12 Claims, 1 Drawing Figure

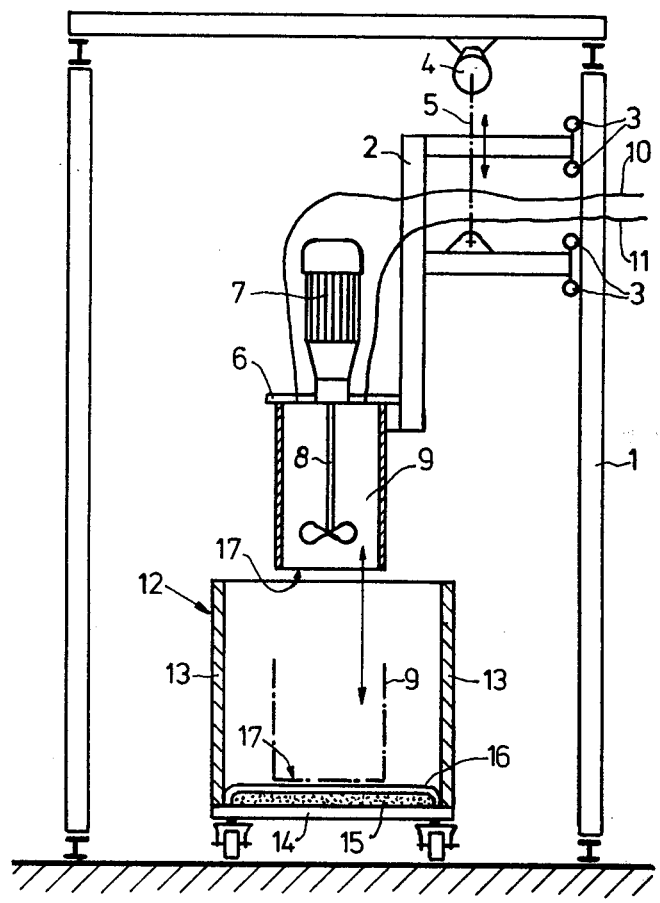

METHOD AND APPARATUS FOR THE DISCONTINUOUS PRODUCTION OF A FOAMED BLOCK

SUMMARY OF THE INVENTION

The invention relates to a device and a method for the discontinuous production of block foam. The device has a mixing unit which is provided with component feed lines and a stirrer and which can be moved vertically in a bridge-like framework. The mixing unit has as a mixing container, a bottomless cylindrical shell which can be arranged to a head plate and can be placed on the bottom of a mold which can be placed beneath it. The bottom of the mold is covered with a flexible elastic layer on top of which is arranged a plastic film.

The device and method of the invention are suitable for the production of small amounts of block foam, for which a continuously operating device is not economically feasible.

BRIEF DESCRIPTION OF THE DRAWING

The drawing schematically represents one embodiment of the invention.

DESCRIPTION OF THE INVENTION

The invention is directed to a device for the discontinuous production of block foam, in which is arranged a mixing unit, provided with component feed lines and a stirring means. The device is vertically movable preferably in a bridge-like framework and has as a mixing container a bottomless cylindrical shell having one closed end, which closed end preferably is arranged as a head plate. The mixing container can be placed on the bottom of a mold made of a rigid material. The mold, preferably a box, can be placed beneath the bottomless cylindrical shell. Release agents can be applied to inner surfaces of the mold. On the bottom of the mold is a flexible elastic layer with a plastic film arranged on top of it.

In particular, the invention comprises a mixing unit, a mold, and a means for moving the mixing unit into and/or out of the mold. The mixing unit comprises a bottomless cylindrical shell having a closed end, a stirring means, and component feed lines. The mixing unit is vertically movable into and/or out of a mold consisting of a rigid material, the interior bottom of which is covered with a flexible elastic layer on which is arranged a plastic film.

The cylindrical surface and/or the closed end of the bottomless cylindrical shell can contain one or more openings for the stirring means and/or the component feed lines.

The invention also is directed to a method for the discontinuous production of block foam by positioning the mold beneath the mixing unit; vertically moving the mixing unit into the mold until the open end of the cylindrical shell depresses the flexible elastic layer and is firmly seated on the bottom of the mold; introducing a foam forming material into the mold through the component feed lines; mixing the material; and then vertically withdrawing the mixing unit from the mold allowing the foaming material to spread within the mold and foam.

In the invention, the bottomless cylindrical shell which serves as a mixing container is lowered onto the bottom of the mold before reactants are introduced. In this process, it is important to have a good sealing effect between the lower rim (i.e., the open end) of the cylindrical shell and the bottom of the mold during the mixing process to prevent unmixed portions of the reaction components from escaping.

Conventional plastic seals are not suitable because once reaction is complete, the reacted material adheres to them. Conventional plastic seals require fresh cleaning each time to allow the rim to rest tightly everywhere.

An object therefore is to provide a good seal between the lower rim of the cylindrical shell and the bottom of the mold, which remains substantially free from contamination due to its design and which also does not need much maintenance. This object is achieved in that a flexible elastic layer on top of which is arranged a plastic film is provided on the bottom of the mold. The flexible elastic layer is preferably from 0.1 to 5 cm thick. A thickness of from 0.3 to 1 cm is particularly suitable.

In one embodiment, the flexible elastic layer comprises a flexible foam mat, a flexible felt mat, a nonwoven fabric, a foam rubber mat or the like.

The plastic film is preferably composed of polyethylene, polypropylene or polyvinylchloride. The film is preferably from 0.05 to 2 mm thick and most preferably from 0.1 to 1 mm thick. This allows the lower rim of the bottomless cylindrical shell to sink into the flexible elastic layer when the cylindrical shell is positioned in the mold. In this way, a good seal can be obtained.

Once the mixing process has ended and the mixing apparatus with the bottomless cylindrical shell has been raised again, the flexible elastic layer nearly regains its original shape and forms a smooth base on which the reaction mixture rapidly spreads in all directions and foams. The plastic film has only slight adhesiveness so that the finished foam detaches itself easily, and the plastic film can be used again.

An embodiment is illustrated purely schematically in the drawing.

A holding device (2) which can be moved up and down is guided in a bridge-like framework (1) by rollers (3). It is suspended on a rope (5) which can be wound up by a motor (4) and supports a head plate (6) on which is arranged a drive motor (7) which drives a stirrer (8). The stirrer projects vertically into a bottomless cylindrical shell (9) which is detachably fixed to the head plate (6) and acts as mixing container. The feed lines for the isocyanate and polyol components are designated by (10) and (11) respectively.

A movable molding box (12) whose inner faces of the hinged side walls (13) have been coated with a mold release agent, preferably a wax, to prevent foam from adhering is placed just beneath the bottomless cylindrical shell (9). The bottom (14) of the molding box (12) is fitted with a foam mat (15, the flexible elastic layer), over which is stretched a plastic film (16) made of polyethylene. The bottomless cylindrical shell (9) rests with its lower rim (17) on this base so as to form a seal as illustrated by the broken lines in the drawing.

The method of making free rise foam using the invention is further illustrated by, but is not limited to, the following embodiment. The molding box (12) containing the flexible elastic layer (15) with the plastic film (16) and whose hinged side walls (13) are coated with a suitable mold release agent, is placed beneath the mixing unit. The mixing unit (illustrated in the drawing by parts 2, 9, 8, 7, 6, 10 and 11) is then lowered by means of the rope (5) and motor (4) on a bridge-like framework (1)

into the molding box (12) until the lower rim (17) of the cylindrical shell (9) contacts the plastic film (16) and depresses the flexible elastic layer (15) so as to firmly seal the cylindrical shell on the bottom of the molding box. The isocyanate and polyol components of the foaming material then are introduced through component feed lines (10) and (11) respectively and mixed by means of the stirrer (9). When the mixing is completed, the mixing unit is withdrawn upwards so that the foaming mixture spreads out within the molding box and foams. The molding box can then be replaced by another and the cycle begins again.

What is claimed is:

1. A method for the discontinuous production of free rise foam comprising:
   (A) positioning a mold consisting of a rigid material, the interior bottom of said mold containing a flexible elastic layer on which is arranged a plastic film; beneath a vertically movable mixing unit comprising a bottomless cylindrical shell having one closed end, a stirring means and component feed lines;
   (B) vertically moving said mixing unit into said mold until the open end of said cylindrical shell depresses said flexible elastic layer and becomes seated on the bottom of said mold;
   (C) introducing into the volume defined by said cylindrical shell seated on the bottom of said mold a foam forming mixture by means of said component feed lines and stirring the mixture with said stirring means;
   (D) vertically withdrawing said mixing unit from said mold allowing completion of the foaming reaction within said mold, and
   (E) removing the foam from said mold.

2. A device for the discontinuous production of block foam comprising:
   (A) a mixing unit comprising:
      (i) a bottomless cylindrical shell having a closed end,
      (ii) a stirring means and
      (iii) component feed lines; said mixing unit being vertically movable into and/or out of
   (B) a mold consisting of a rigid material, the interior bottom of said mold containing:
      (i) a flexible elastic layer on which is arranged
      (ii) a plastic film; and
   (C) a means for moving said mixing unit into and/or out of said mold.

3. A device according to claim 2, characterized in that said flexible elastic layer is from 0.1 to 5 cm thick.

4. A device according to claim 2, characterized in that said flexible elastic layer comprises a flexible foam mat, a flexible felt mat, a non-woven fabric or a foam rubber mat.

5. A device according to claim 3, characterized in that said flexible elastic layer is selected from the group consisting of a flexible foam mat, a flexible felt mat, a non-woven fabric, and a foam rubber mat.

6. A device according to claim 2, characterized in that said plastic film is selected from the group consisting of polyethylene film, polypropylene film, and polyvinylchloride film.

7. A device according to claim 2, characterized in that said flexible elastic layer is from 0.1 to 5 cm thick and said plastic film is selected from the group consisting of polyethylene film, polypropylene film, and polyvinylchloride film.

8. A device according to claim 2, characterized in that said flexible elastic layer is selected from the group consisting of a flexible foam mat, a flexible felt mat, an impervious non-woven fabric and a foam rubber mat, and said plastic film is selected from the group consisting of polyethylene film, polypropylene film and polyvinylchloride film.

9. A device according to claim 2, characterized in that said flexible elastic layer is from 0.1 to 5 cm thick, and is selected from the group consisting of a flexible foam mat, a flexible felt mat, an impervious non-woven fabric and a foam rubber mat; and said plastic film is selected from the group consisting of polyethylene film, polypropylene film, and polyvinylchloride film.

10. A device according to claims 2 or 3, characterized in that said plastic film is from 0.05 to 2 mm thick.

11. A device according to claim 2, characterized in that the cylindrical surface and/or the closed end of said bottomless cylindrical shell contains one or more openings for said stirring means and/or said component feed lines.

12. A device according to claim 1, characterized in that said vertically movable mixing unit is guided by a carrier means in a bridge-like framework.

* * * * *